July 2, 1963  K. W. WANNER  3,096,106
TORQUE TRANSMITTING BEARING
Filed Sept. 15, 1960  3 Sheets-Sheet 1

INVENTOR.
Keith W. Wanner
BY
*Price and Heneveld*
ATTORNEYS

INVENTOR.
KEITH W. WANNER
BY

July 2, 1963  K. W. WANNER  3,096,106
TORQUE TRANSMITTING BEARING
Filed Sept. 15, 1960  3 Sheets-Sheet 3

INVENTOR
KEITH W. WANNER
BY Price and Heneveld
ATTORNEY

United States Patent Office 3,096,106
Patented July 2, 1963

3,096,106
TORQUE TRANSMITTING BEARING
Keith W. Wanner, Grand Rapids, Mich., assignor to Corduroy Rubber Company, Grand Rapids, Mich., a corporation of Delaware
Filed Sept. 15, 1960, Ser. No. 56,183
8 Claims. (Cl. 287—53)

This invention relates to a resilient hub jacket and more particularly to a resilient hub jacket which may be utilized with marine propellers and the like.

This application is a continuation-in-part of co-pending application Serial No. 806,028, filed April 13, 1959, now Patent No. 2,962,312 entitled, Torque Transmitting Bearing for Propellers.

It is known to mount propellers on the drive shafts therefor by means of an intermediate, shock absorbing, torque transmitting bearing, sometimes referred to as a cushion bearing. Such a bearing comprises a vulcanized rubber member which frictionally engages the inside diameter of the hub of the propeller. When the torque difference between the propeller shaft and propeller reaches a predetermined, maximum level, as might occur under operative conditions when the propeller strikes an immovable object, the frictional engagement is overcome and slippage occurs, leaving the propeller shaft free to rotate until the propeller is again free to move. Such a bearing functions to relieve sudden shock loads on the propeller shaft, which would tend to damage the same.

Heretofore, it has been common practice to manufacture such bearings by vulcanizing the rubber member to the outside diameter of a metallic bushing adapted to fit on the propeller shaft. In other words, it has therefore been common practice to make the rubber member an integral part of a metal bushing for the shaft. Such a construction, however, has a number of disadvantages.

One major disadvantage resides in the fact that bushing manufacturers are usually not equipped to form the rubber member on the bushing and rubber goods manufacturers are usually not equipped to manufacture the bushings. As a result, it has heretofore been necessary for bushing manufacturers to ship the bushings to the rubber goods manufacturers and for the rubber goods manufacturers to ship the bearings back to the bushing manufacturers or to the marine supplier. Thus, considerable transportation expense has heretofore been involved in manufacturing cushion bearings.

Another major disadvantage of such a construction resides in the difficulty involved in replacing the rubber member when it becomes worn. Heretofore, the cushion bearing had to be removed from the propeller shaft and shipped to a factory equipped to vulcanize rubber. Here it was necessary to remove the worn rubber member and then to rebuild a new rubber member thereon. If the bushing had an outside diameter even slightly different from that previously encountered, a new rubber mold had to be made or the outside diameter of the bushing had to be machined down to fit the existing rubber molds. In either case it is necessary that the bushing shaft have accurate outside diameters relative to the rubber mold. Thus, to replace a rubber member of the type heretofore involved includes a number of manipulative operations, a major shipping expense, and a considerable amount of time.

Although this invention is particularly adapted to use with marine propellers, the structure and method employed herein is also equally suitable for providing a pulley or friction gear with a resilient friction type ring.

An object of this invention is to provide a cushion bearing for marine propellers, which avoids the above-mentioned disadvantages.

Still another object of this invention is to provide a cushion bearing for marine propellers, which is secured against both longitudinal and transverse movement.

Still another object of this invention is to provide a simple and economical manner of securing the friction ring to a pulley or friction gear.

These and other objects and advantages of this invention will become more apparent upon reading the following specification in conjunction with the accompanying drawings.

In general, the drawings disclose a torque transmitting bearing or cushion bearing in which the resilient, friction holding, portion thereof is a separate, removable member. The cushion bearing comprises a non-resilient bushing adapted for mounting on the propeller shaft and for receiving the resilient member. The resilient member is in the form of a bushing. Both the nonresilient bushing and the resilient bushing are adapted with means for holding the resilient bushing in position on the non-resilient bushing under normal use conditions and for transmitting torque from the non-resilient bushing to the resilient bushing.

A friction ring may be secured to a pulley or friction gear using the same principle as employed in securing the resilient bushing to the non-resilient bushing.

Figure 1:
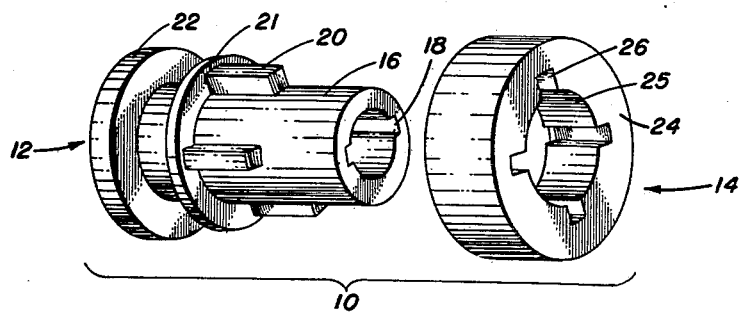
FIG. 1 is an exploded, perspective view of a preferred embodiment of the cushion bearing of this invention.

Specifically, FIG. 1 of the drawings discloses a cushion bearing 10 which comprises a non-resilient bushing 12 and a resilient bushing 14.

The non-resilient bushing 12 comprises a tube 16 having an inside diameter sufficiently greater than the outside diameter of a propeller shaft 17 (FIGS. 3 and 4) so as to engage the same in sliding fit. On the inside of the tube 16 and disposed parallel to the axis thereof is at least one and preferably two keyways 18 for receiving and engaging at least one and preferably two corresponding keys 19 on the propeller shaft 17.

The outside of the tube 16 is provided with means for receiving and engaging the resilient bushing 14. These means comprise at least one and preferably a plurality of flanges 20. These flanges are preferably arranged parallel to the axis of the tube. At the forward end of the flanges 20 there is provided a centering collar 21.

The tube 16 may also be provided with an annular flange 22 at the front end thereof for use in securing the non-resilient bushing 12 to the propeller shaft 17.

Figure 2:
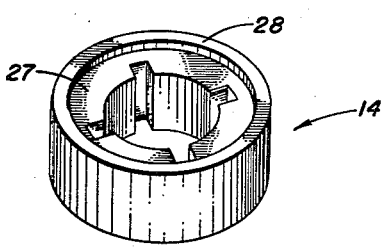
FIG. 2 is a perspective view of the front portion of the resilient bushing member of the bearing of FIG. 1.
Figure 5:
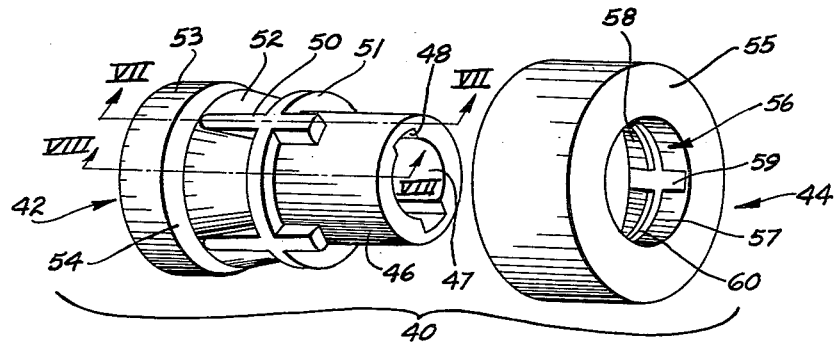
FIG. 5 is an exploded, perspective view of a modified embodiment of the cushion bearing of this invention.
Figure 7:
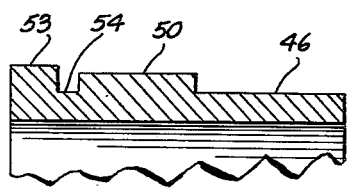
FIG. 7 is a cross sectional view taken along the section lines VII—VII of FIG. 5.
Figure 8:
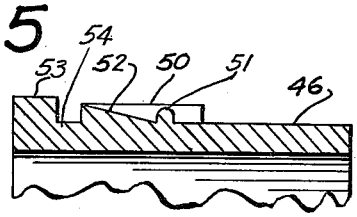
FIG. 8 is a cross sectional view taken along the section lines VIII—VIII of FIG. 5.

The resilient bushing 14 comprises a cylindrical block 24 having an inner, coaxial, passageway 25. The passageway 25 has an inside diameter substantially that of the outside diameter of the tube 16. In addition, at the inside diameter of the inner passageway 25 there is provided a slot 26 for each flange 20 of the non-resilient bushing 12. The slots are preferably arranged parallel to the axis of the cylindrical block 24 and are spaced to receive the flanges 20. The front end (see FIG. 2) of the cylindrical block 24 is provided with an annular, outwardly extending lip 28. The presence of the lip 28 provides an inner annular recess 27 on the front end of the cylindrical block 24 for receiving the centering collar 21 of the non-resilient bushing 12. The outside diameter of the cylindrical block 24 is selected to provide a predetermined friction fit of the resilient bushing 14 within the hub 30 of a propeller 31 for which the cushion bearing 10 is intended (see FIGS. 3 and 4). The surface at the outside diameter of the resilient bushing member is characterized by a significant coefficient of friction relative to the surface of the inside diameter of the propeller hub for which the cushion bearing 10 is intended.

*Modifications*

FIGS. 5 through 10 disclose a modified form of the torque transmitting bearing for propellers which is designated generally as 40. The assembly 40 includes a non-resilient bushing 42 and a resilient bushing in the form of a cylindrical block 55.

The non-resilient bushing 42 is generally similar in configuration to the non-resilient bushing 12, shown in FIG. 1. It is in the form of a tube 46 having a centrally disposed bore 47. The bore 47 is provided with a pair of oppositely disposed keyways 48 adapted to receive the keys 19 of the propeller shaft 17.

The outer circumference of the tube 46 is provided with longitudinal flanges 50 which are positioned at equally spaced intervals thereabout. For purposes of disclosure, four longitudinal flanges are illustrated; however, it is to be understood that within the broadest aspect of this invention this number may be increased or decreased. An annular flange 51 is positioned intermediate the ends of the longitudinal flanges and is disposed transversely with respect thereto. The transverse flange 51 in combination with the longitudinal flanges 50 constitute a key for purposes which will be explained more fully hereinafter.

The tube 46 has a tapered collar 52 which flares outwardly therefrom. The tapered collar 52 operates as a stop to position the resilient bushing 55 with respect to the non-resilient bushing 42. The ends of the longitudinal flanges 50 are tapered to correspond with the taper of collar 52.

Figure 10:
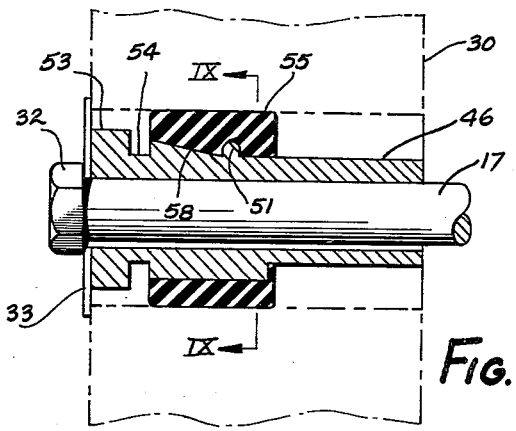
FIG. 10 is a side sectional fragmentary view of a propeller hub mounted on a propeller shaft with the cushion bearing of FIG. 5, which view is taken along the section lines X—X of FIG. 9.
Figure 9:
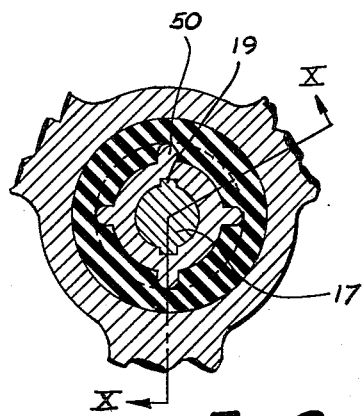
FIG. 9 is a cross sectional, fragmentary view of a propeller hub mounted on a propeller shaft with the cushion bearing FIG. 5, which view is taken along the section lines IX—IX of FIG. 10.
Figure 6:
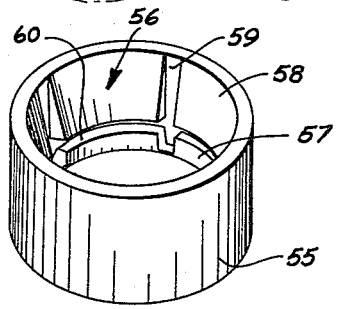
FIG. 6 is a perspective view of the front portion of the resilient bushing member of the cushion bearing of FIG. 5.
Figure 11:
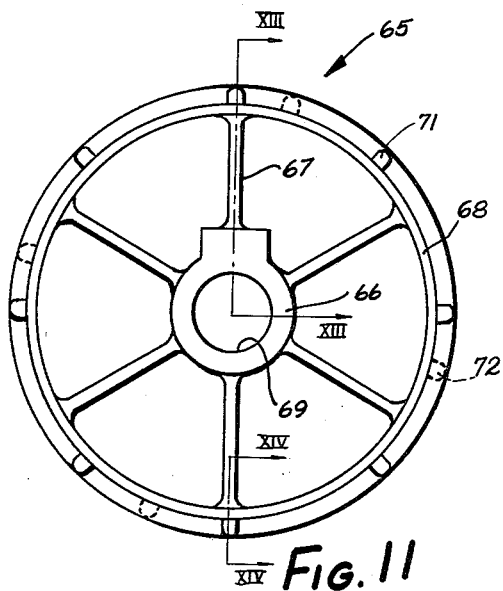
FIG. 11 is an end elevational view of a rotary member adapted to receive a resilient hub jacket or friction ring in accordance with this invention.
Figure 12:
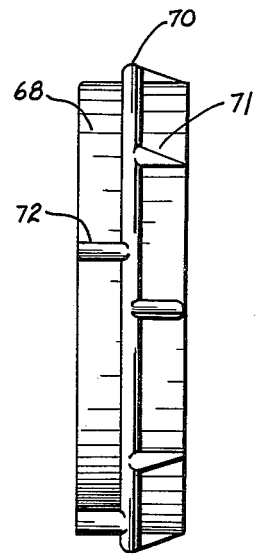
FIG. 12 is a side elevational view of the rotary member shown in FIG. 11.
Figure 13:
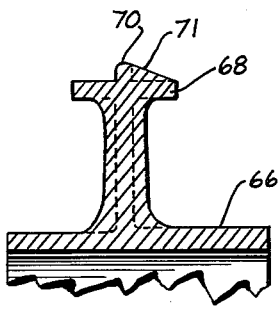
FIG. 13 is a fragmentary cross sectional view taken along the section lines XIII—XIII of FIG. 11.
Figure 14:
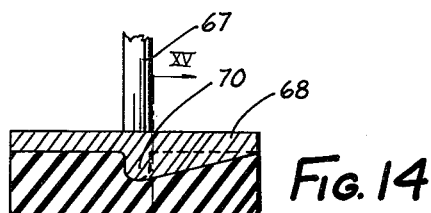
FIG. 14 is a fragmentary cross sectional view taken along the section lines XIV—XIV of FIG. 11 and showing a friction ring mounted on the rotary member.
Figure 15:
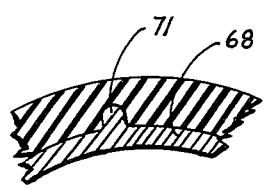
FIG. 15 is a fragmentary cross sectional view taken along the section lines XV—XV of FIG. 14.

A band 53 is formed on the end of the tube 46 opposite the flanges 50 and 51. The band 53 is separated from the tapered collar 52 by an annular recess 54. The end of the band 53 operates as a bearing surface for the propeller shaft washer 33, and is best shown in FIG. 10.

The body 55 of the resilient bushing 44 is of a cylindrical configuration and conforms substantially to the design of the resilient bushing 14 of the FIG. 1 embodiment. It has an internal passage 56 which is divided into an annular portion 57 and a tapered portion 58. The annular portion 57 and the tapered portion 58 are separated by a transverse groove 60 which corresponds in configuration to the transverse flange 51 formed on the tube 46. Equally spaced longitudinal slots 59 are also formed in the internal passage 56 and correspond in spacing and configuration to the longitudinal flanges 50 formed in the tube 46. The tapered portion 58 of the internal passage 56 is also tapered the same degree as the tapered collar 52 on tube 46. The transverse groove 60 and longitudinal slots 59 form a keyway which interengages with the key formed on the non-resilient bushing providing a means of securing together the resilient and non-resilient bushing 44 and 42 respectively.

The tapered portion 58 of the resilient bushing 44 facilitates assembly of the resilient bushing upon the non-resilient bushing 42. This is apparent from the fact that initially the diameter of the tapered portion 58 is greater than that of the outer diameter of the tube 46. Thus, the tapered portion of the resilient bushing 44 will have easier passage over the longitudinal flanges 50 and transverse flange 51 which are also of greater diameter than the outside diameter of the tube 46. However, once the transverse groove 60 in resilient bushing 44 has received the transverse flange 51, the resilient bushing and non-resilient bushing are locked together and removal of the resilient bushing is extremely difficult. Thus, in this modified form of torque transmitting bearing, longitudinal movement as well as transverse or rotating movement of the resilient bushing with respect to the non-resilient is virtually impossible.

FIGS. 11 through 16 show another form of rotary member utilized for transmitting torque and is designated generally as 65. Although the rotary member 65 is disclosed as a pulley, it is to be understood that within the broadest aspect of the invention the design may be that of a friction gear or some other like member.

The rotary member 65 includes a centrally disposed hub 66 which is surrounded by a rim 68 which is spaced therefrom. The hub 66 and rim 68 are interconnected by a series of equally spaced spokes 67. The hub 66 is provided with a centrally disposed shaft aperture 69 which is adapted to receive a drive shaft (not shown). The hub 66 may also be provided with a key or set screw (not shown) which is utilized to affix the rotary member 65 to the drive shaft.

A rim 68 is provided with an annular flange 70 which is formed intermediate the side edges thereof. The annular flange 70 extends about the entire circumference of the rim 68 and projects outwardly therefrom.

Tapered ribs 71 are formed on the rim 68 and are positioned at equally spaced points about the circumference of the rim. The ribs 71 taper from the annular flange toward the edge of the rim 68 for purposes which will be explained more fully hereinafter. The ribs 71 are directed at an angle which is substantially normal to the annular flange 70. Eight tapered ribs are shown for purposes of disclosure; however, it is to be understood that within the broadest aspect of the invention more or less ribs may be utilized.

Bosses 72 are also formed on the rim 68 and project at a direction normal to the annular flange 70, and in a direction opposite from the tapered ribs 71. The bosses 72 are also positioned at different points about the circumference of the rim 68 than are the tapered ribs 71. The spacing is such that two tapered ribs 71 appear between each of the bosses 72. The reason for this will be explained more fully hereinafter.

Figure 16:
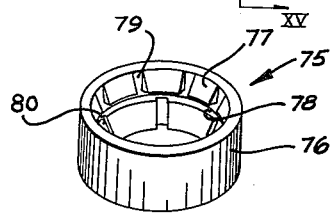
FIG. 16 is a perspective view of the front portion of the friction ring or resilient hub.

The friction ring or resilient hub 75 designed to be used on the rotary member 65 is best shown in FIG. 16. The friction ring is made of a material such as rubber and is ringlike in configuration. The outer circumference of the ring 75 is smooth and adapted to engage another member to transmit torque thereto.

The inner circumference or internal passage 77 of the friction ring 75 is provided with an annular groove 78 intermediate the side edges thereof. The annular groove 78 corresponds in configuration to the annular flange 70 formed on the rib 68. Also formed in the internal passage 77 are rib slots 79 and boss slots 80. These slots conform in configuration to the tapered ribs 71 and bosses 72 formed on the rim 68. The spacing of the rib slots and boss slots about the internal passage 77 also corresponds to the spacing of the tapered ribs 71 and bosses 72 about the rim 68.

*Operation and Assembly*

The cushion bearing 10 is assembled by merely sliding the resilient bushing 14 over the back end of the non-resilient bushing 12 with the slots 26 aligned with the flanges 20. The resilient bushing 14 is pushed forwardly until the centering collar 21 is seated within the annular recess 27. The resilient bushing 14 can be removed from the non-resilient bushing 12 merely by reversing the assembly procedure.

Figures 3, 4:
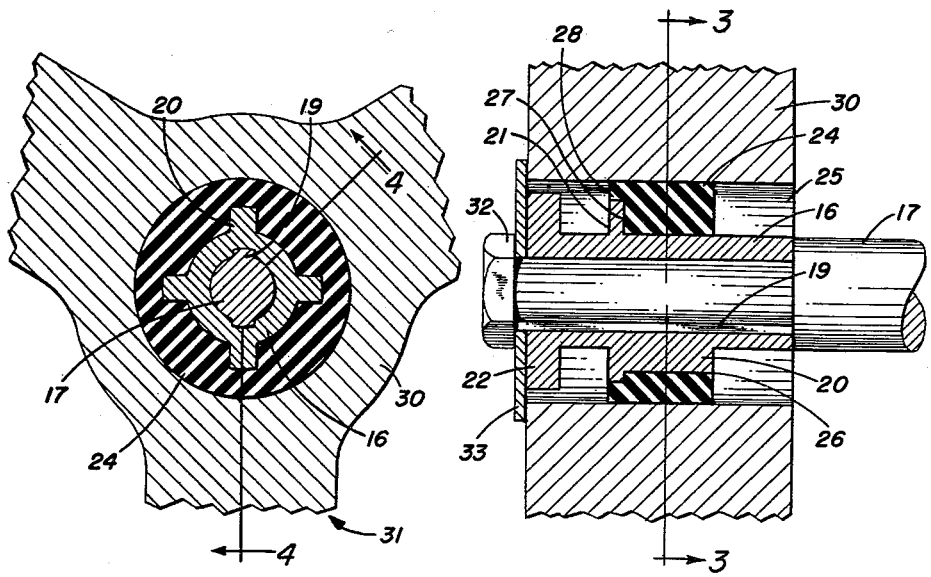
FIG. 3 is a cross sectional, fragmentary, view of a propeller hub mounted on a propeller shaft with the cushion bearing of FIG. 1, which view is taken as along the cutting plane III—III of FIG. 4.
FIG. 4 is a side, sectional, fragmentary, view of a propeller hub mounted on a propeller shaft with the cushion bearing of FIG. 1, which view is taken as along the cutting planes IV—IV of FIG. 3.

To mount the propeller 31 on the propeller shaft 17, the following described procedure may be used. The cushion bearing 10 is first mounted on propeller shaft 17. Then, the hub 30 of the propeller 31 is carefully thrust over the resilient bushing 14 until the front end thereof is in alignment with the front of the annular flange 21 of the non-resilient bushing 12. The usual fastening means of the propeller shaft 17 may then be used. As shown in FIG. 4, such means comprise a threaded fastener 32 threadedly connected to the end of the propeller 31, and a washer 33 between the threaded fastener 32 and the front end of the cushion bearing 10.

To facilitate mounting the resilient bushing 14 on the non-resilient bushing 12 and mounting the propeller 31 on the cushion bearing 10, the outside diameter of the tube 16 and the outside diameter of the cylindrical block 24 may be coated with a film of petroleum jelly. When the resilient bushing 14 is composed of vulcanized rubber, the petroleum jelly becomes absorbed therein within a period of about 24 hours and without reducing the friction between the inside diameter of the hub 30 and the outside diameter of the resilient bushing 14 below that desired.

This invention may be embodied in several forms without departing from the spirit or central characteristics thereof. Thus, in the embodiment described in the drawings, the collar 21 may be eliminated and the annular flange 22 used instead. On the other hand the annular recess 27 in the resilient bushing 14 may be eliminated, if so desired, without adversely affecting the functioning of the bushing 14. The annular recess 27 has an advantage, however, in that the lip 28 does cover the centering collar 21 or annular flange 22, as the case may be, and thereby assists in seating the resilient bushing 14 at the proper position as well as to minimize chances of damage when the resilient bushing 14 has become worn.

A modified form 40 of torque transmitting bearing for propellers is assembled in a manner similar to the FIG. 1 embodiment. The longitudinal slots 59 of the resilient bushing 44 are aligned with the longitudinal flanges 50 on the non-resilient bushing 42. The resilient bushing 44 is then slid over the tube 46 and pressed thereupon until the transverse flange 51 snaps into the transverse groove 60 formed in the resilient bushing 44. The resilient bushing 44 is then keyed or locked to the non-resilient bushing 42. Assembly of the resilient bushing 44 on the non-resilient bushing 42 is facilitated by the tapered portion 58 of internal passage 56 which facilitates passage of the resilient bushing 44 over the transverse flange 51.

Due to the interconnection of the transverse flange 51 with the transverse groove 60, withdrawal of the resilient bushing 44 from the non-resilient bushing 42 is virtually impossible. Thus, if the resilient bushing 44 becomes worn due to prolonged use, the resilient bushing 44 is normally removed from the non-resilient bushing 42 by cutting it therefrom.

The torque transmitting bearing 40 is otherwise assembled to the propeller shaft 17 and the propeller 30 in a manner similar to the torque transmitting bearing 10 and will therefore not be again explained in detail.

The assembly of the friction ring 75 to the rotary member 65 is similar to the assembly of the other embodiments. The boss slots 80 and rib slots 79 are aligned with the tapered ribs and bosses formed on the rim 68. The reason for spacing the rib slots between the boss slots now becomes apparent. Since the portion of the friction ring which contains the boss slots is first inserted on the rim, the material of the friction ring between the boss slots 80 will engage the tapered ribs 71. As the friction ring is pressed onto the rim 68, the tapered ribs facilitate passage of the friction ring since the material between the boss slots 80 is of substantially the same diameter as the outside diameter of rim 68. Thus, the tapered ribs 71 in effect act as a wedge to spread the friction ring 75 and thus facilitating its assembly on the rim 68.

The friction ring 75 is pressed onto the rim 68 until the annular flange 70 snaps into the annular groove 78. The friction ring 75 is thus keyed to the rim 8. The annular flange 70 prevents longitudinal movement of the friction ring with respect to the rim 68, and the ribs and bosses 71 and 72 prevent rotative movement of the friction ring with respect to the rim 68.

The friction ring 75 is similar to the resilient bushing 44 in that once it is assembled it is virtually impossible to remove it from the member to which it is keyed. Therefore, if the friction ring becomes worn excessively, removal thereof for new installation is best accomplished by cutting it loose from the rotary member.

Thus, there is provided a cushion bearing which can be readily serviced. The resilient bushing can be readily mounted and can be readily removed. The parts thereof can be manufactured in standard sizes and in large quantities. No longer is it necessary to ship the bushing to the rubber manufacturer for initial and replacement mounting of the cushion to the shaft. Shipping costs are reduced thereby. Accuracy of the outside diameter of the non-resilient bushing is no longer an important factor. Other features and advantages of this invention will be apparent to those of ordinary skill in the art after reading the foregoing description.

Consequently, the embodiment just described is therefore illustrative and not restrictive, since the scope of the invention is defined by the appended claims rather than by the description preceding them, and all changes that fall within the metes and bounds of the claims, or that form their functional as well as conjointly cooperative equivalents, are therefore intended to be embraced by those claims.

I claim:

1. A torque-limiting and vibration-absorbing bearing for mounting a propeller hub on a propeller shaft and for transmitting torque from said shaft to said hub, which comprises: a non-resilient bushing member mountable on said shaft and having an outside circumference less than the inside circumference of said hub; longitudinal and transverse flange means on said non-resilient bushing; a resilient bushing member slidably mounted on said non-resilient bushing member and having a substantially smooth, cylindrical outer surface of a diameter sufficient to provide slippage between said resilient bushing member and said hub when the torque to be transmitted therebetween exceeds a predetermined amount, said resilient bushing member having on the inside circumference thereof longitudinal and transverse flange receiving slot means and portions on both sides of said longitudinal and transverse slot means cooperating with and engaging said flange means to prevent all movement of said resilient bushing member with respect to said non-resilient bushing member after installation of said resilient bushing member on said non-resilient bushing member; and said cylindrical outer surface having a sufficient coefficient of friction relative to the surface of the inside circumference of said hub to prevent rotary motion of said hub with respect to said resilient bushing member during normal operation of said propeller.

2. A torque-limiting and vibration-absorbing bearing for mounting a propeller hub on a propeller shaft and for transmitting torque from said shaft to said hub, which comprises: a non-resilient bushing member mountable on said shaft and having an outside circumference less than the inside circumference of said hub, said bushing member having at the outside circumference thereof longitudinal flanges spaced thereabout, an annular flange about the outside circumference of said bushing being positioned transversely to said longitudinal flanges and intermediate the ends of said longitudinal flanges, a resilient bushing member slidably mounted on said non-resilient bushing member and having a substantially smooth, cylindrical outer surface of a diameter sufficient to provide slippage between said resilient bushing member and said hub when the torque to be transmitted therebetween exceeds a predetermined amount, said resilient bushing member having on the inside circumference thereof flange receiving slots corresponding to said longitudinal flanges and said transverse annular flange, and said cylindrical outer surface having a sufficient coefficient of friction relative to the surface of the inside circumference of said hub to prevent rotary motion of said hub with respect to said resilient bushing member during normal operation of said propeller.

3. A torque-limiting and vibration-absorbing bearing for mounting a propeller hub on a propeller shaft and for transmitting torque from said shaft to said hub, which comprises: a non-resilient bushing member mountable on said shaft and having an outside circumference less than the inside circumference of said hub, said bushing member having at the outside circumference thereof longitudinal and transverse flange means; a resilient bushing member slidably mounted on said non-resilient bushing member and having a substantially smooth, cylindrical outer surface of a diameter sufficient to provide slippage between said resilient bushing member and said hub when the torque to be transmitted therebetween exceeds a predetermined amount, said resilient bushing member having on the inside circumference thereof flange receiving slots corresponding to said flange means, a portion of the inside circumference of said resilient bushing member being tapered to facilitate assembly on said non-resilient bushing, and said cylindrical outer surface having a sufficient coefficient of friction relative to the surface of the inside circumference of said hub to prevent rotary motion of said hub with respect to said bushing member during normal operation of said propeller.

4. A torque-limiting and vibration-absorbing bearing for mounting a propeller hub on a propeller shaft and for transmitting torque from said shaft to said hub, as in claim 3 wherein said non-resilient bushing has a tapered collar complementary to said tapered portion on said resilient bushing.

5. A rotatable member comprising; a hub, a rim surrounding said hub and being spaced therefrom by support means secured therebetween; said rim having key means including an annular flange about the periphery and intermediate the side edges thereof, bosses and ribs extending from respective sides of said annular flange at a direction normal thereto and spaced at intervals about said rim, and a friction ring having a smooth outer surface and keyway means formed in the inner surface thereof including an annular groove corresponding to said annular flange and rib and boss slots corresponding to said ribs and bosses; said friction ring being secured to said rim by inner engagement of said key means and said keyway means.

6. A rotatable member as in claim 5 wherein said ribs are tapered to facilitate assembly of said friction ring on said rim.

7. A rotatable member as in claim 5 wherein said ribs are positioned at different points about the periphery of said rim than said bosses to facilitate assembly of said friction ring on said rim.

8. A pulley or the like, having a friction surface adapted to engage and drive another member comprising, a hub adapted to be secured to a drive shaft, a cylindric rim surrounding said hub and being secured thereto by inner connecting spokes, key means including an annular flange formed about the circumference of said rim intermediate the edges thereof, ribs and bosses extending from respective sides of said annular flange at a direction normal thereto and spaced at intervals about said rim, said ribs being tapered from the annular flange toward the edge of said rim and being positioned at points about said rim other than said bosses, and a friction ring having a smooth outer surface adapted to engage and drive another member, keyway means formed in the inner surface of said friction ring including an annular groove corresponding to said annular flange and rib and boss slots corresponding to said ribs and bosses, said friction ring being resilient and slidable onto said rim, inner engagement of said key means with said keyway means locking said friction ring to said rim.

References Cited in the file of this patent

UNITED STATES PATENTS

| 331,068 | Larzelere | Nov. 24, 1885 |
| 1,772,495 | Powell | Aug. 12, 1930 |
| 1,839,094 | Geyer | Dec. 29, 1931 |
| 2,079,460 | Marty | May 4, 1937 |
| 2,235,605 | Bugatti | Mar. 18, 1941 |
| 2,724,770 | Onksen | Nov. 22, 1955 |
| 2,872,225 | Walker | Feb. 3, 1959 |
| 2,962,312 | Wanner | Nov. 29, 1960 |

FOREIGN PATENTS

| 748,096 | France | Apr. 10, 1933 |